US012695143B2

(12) United States Patent
Lee

(10) Patent No.: US 12,695,143 B2
(45) Date of Patent: Jul. 28, 2026

(54) METHOD AND SYSTEM FOR MANUFACTURING BATTERY CELL

(71) Applicants: Hyundai Motor Company, Seoul (KR); Kia Corporation, Seoul (KR)

(72) Inventor: Dae Won Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 887 days.

(21) Appl. No.: 18/078,590

(22) Filed: Dec. 9, 2022

(65) Prior Publication Data

US 2024/0021935 A1    Jan. 18, 2024

(30) Foreign Application Priority Data

Jul. 12, 2022    (KR) ........................ 10-2022-0085493

(51) Int. Cl.
 H01M 50/198      (2021.01)
 H01M 4/88      (2006.01)
(52) U.S. Cl.
 CPC ....... H01M 50/198 (2021.01); H01M 4/8875 (2013.01)
(58) Field of Classification Search
 CPC ............. H01M 50/198; H01M 4/8875; H01M 10/0404
 See application file for complete search history.

(56) References Cited

U.S. PATENT DOCUMENTS

2021/0050637 A1    2/2021  Kim et al.

FOREIGN PATENT DOCUMENTS

| CN | 111483865 A | 8/2020 | |
| JP | 6019137 B2 | 11/2016 | |
| KR | 101905992 B1 | 10/2018 | |
| KR | 1020190059620 A | 5/2019 | |
| KR | 20210108051 A * | 9/2021 | ............ H01M 4/382 |
| KR | 1020210145534 A | 12/2021 | |
| KR | 1020220052487 A | 4/2022 | |

OTHER PUBLICATIONS

English translation of Seok KR202108051 (Year: 2021).*

* cited by examiner

*Primary Examiner* — Sarah A. Slifka
(74) *Attorney, Agent, or Firm* — Fish & Richardson P.C.

(57) ABSTRACT
Disclosed is a method of manufacturing a bi-cell of a secondary battery. The bi-cell is configured such that, among electrodes of the bi-cell, a first electrode has a reference surface and is formed to have a designated thickness, a circumference of the reference surface is defined by at least four side parts, and, among the at least four side parts, a first side part and a second side part are symmetrical to each other with respect to a center of the reference surface, and a third side part and a fourth side part are symmetrical to each other with respect to the center of the reference surface, and the method includes adhering first compensation members to the first side part and the second side part simultaneously or at different times, and adhering second compensation members to the third side part and the fourth side part simultaneously or at different times.

7 Claims, 15 Drawing Sheets

METHOD AND SYSTEM FOR MANUFACTURING BATTERY CELL

CROSS-REFERENCE TO RELATED APPLICATION

This application claims under 35 U.S.C. § 119(a) the benefit of priority to Korean Patent Application No. 10-2022-0085493 filed on Jul. 12, 2022, the entire contents of which are incorporated herein by reference.

TECHNICAL FIELD

The present disclosure relates to a secondary battery. More particularly, it relates to a method of manufacturing a bi-cell of a secondary battery.

BACKGROUND

A secondary battery is an energy storage device which is rechargeable. In most secondary batteries, cells are manufactured based on a liquid electrolyte which is an organic solvent, and are thus limited in terms of improvement in stability and energy density. Therefore, all-solid-state batteries using a solid electrolyte are being vigorously developed now.

Because an all-solid-state battery uses a solid electrolyte instead of a liquid electrolyte, the all-solid battery requires formation of interfaces having high quality between both electrodes, i.e., a negative electrode and a positive electrode, and the electrolyte to secure performance, such as energy density. For this purpose, a high-pressure pressing process configured to firmly press electrode materials and the electrolyte against each other is typically employed. However, the high-pressure pressing process may cause damage to or breakage of a workpiece.

Before the all-solid-state battery is put into a high-pressure press, a bi-cell can be prepared by sequentially stacking thin-film materials, such as the negative electrode, the electrolyte and the positive electrode, to secure the interfaces. Here, the negative electrode and the positive electrode may have different sizes depending on the design of a product. This dimension difference may cause damage to the product.

SUMMARY

The present disclosure has been made in an effort to solve the above-described problems associated with the prior art, and it is an object of the present disclosure to provide a method of manufacturing a battery which may compensate for a dimension difference between a negative electrode and a positive electrode to prevent damage to electrodes during a pressing process.

It is another object of the present disclosure to provide a method of manufacturing a battery which may stabilize a process of adhering compensation members for compensating for a dimension difference between a negative electrode and a positive electrode, and may improve the quality of the battery as a whole.

In one aspect, the present disclosure provides a method of manufacturing a bi-cell of a battery configured such that, among electrodes of the bi-cell, a first electrode has a reference surface and a designated thickness, a circumference of the reference surface is defined by at least four side parts, wherein, among the at least four side parts, a first side part and a second side part are symmetrical to each other with respect to a center of the reference surface, and a third side part and a fourth side part are symmetrical to each other with respect to the center of the reference surface, the method including adhering first compensation members to the first side part and the second side part simultaneously or at different times, and adhering second compensation members to the third side part and the fourth side part simultaneously or at different times.

In another aspect, the present disclosure provides a system for manufacturing a bi-cell of a battery, including an electrode sheet roll configured to feed an electrode sheet, a first compensation member roll configured to continuously feed a first continuous body of compensation member, and a combination unit configured to combine the fed electrode sheet and the fed first continuous body of compensation member with each other, wherein the first continuous body of compensation member is adhered to a first side part and a second side part of the electrode sheet, and the first side part and the second side part are located to be symmetrical to each other.

Other aspects and implementations of the disclosure are discussed below. The above and other features of the disclosure are discussed below.

BRIEF DESCRIPTION OF THE DRAWINGS

The above and other features of the present disclosure will now be described in detail with reference to certain exemplary implementations thereof illustrated in the accompanying drawings which are given hereinbelow by way of illustration only, and thus are not limiting of the present disclosure, and wherein:

FIG. 5A is a front view showing example compensation members;

FIG. 7 is a plan view of an example negative electrode;

FIGS. 8A to 8C are views showing an example process of adhering the compensation members according to the present disclosure;

Figure 1:
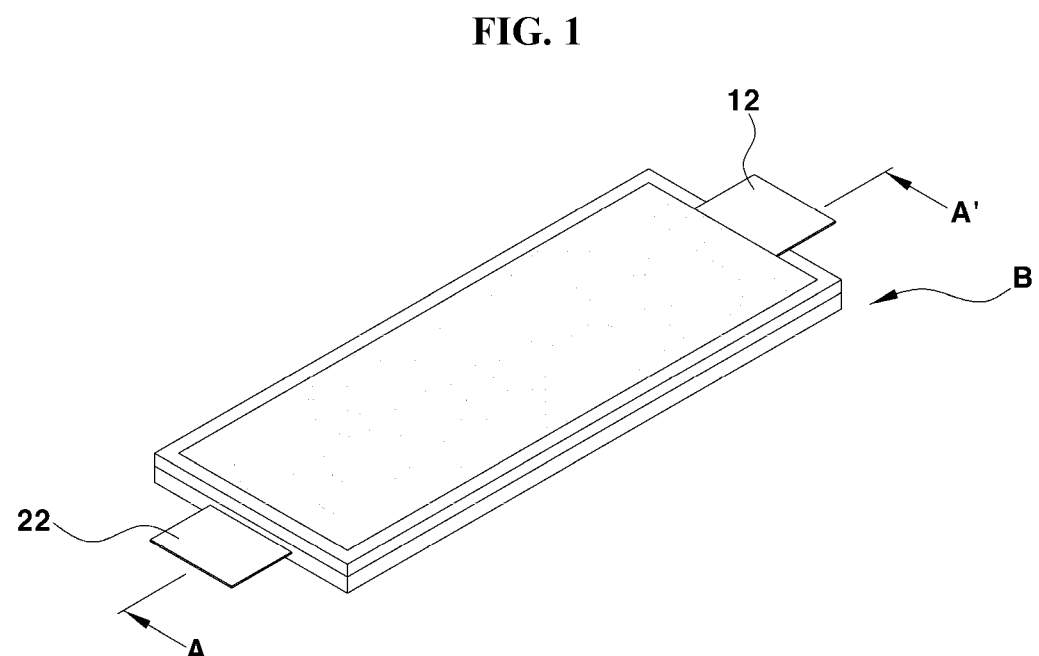
FIG. 1 is a perspective view of an example bi-cell.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Specific structural or functional descriptions in implementations of the present disclosure set forth in the description which follows will be exemplarily given to describe the implementations of the present disclosure, and the present disclosure may be embodied in many alternative forms. Further, it will be understood that the present disclosure should not be construed as being limited to the implementations set forth herein, and the implementations of the present disclosure are provided only to completely disclose the disclosure and cover modifications, equivalents or alternatives which come within the scope and technical range of the disclosure.

Hereinafter the present disclosure will be described in detail with reference to the accompanying drawings.

As described above, a dimension difference between a negative electrode and a positive electrode stacked in a battery or a stepped profile may occur. In general, the positive electrode has a smaller size than the negative electrode, which may cause specific problems when the battery is manufactured.

In particular, an all-solid-state battery using a solid electrolyte should secure interfaces having higher quality between the negative electrode and the electrolyte and between the electrolyte and the positive electrode than a battery including a liquid electrolyte. Therefore, the all-solid-state battery typically undergoes a high-pressure pressing process. In case in which there is a dimension difference between the negative electrode and the positive electrode, the high-pressure pressing process may cause damage, such as insulation breakdown among the negative electrode, the electrolyte and the positive electrode. Therefore, members configured to prevent such damage is used. However, such members are individually adhered to the respective electrodes, thus potentially reducing ease of mass production.

Therefore, the present disclosure provides a method of manufacturing a battery in which members configured to compensate for a dimension difference between a negative electrode and a positive electrode may be accurately and effectively adhered to the battery.

Figure 2:
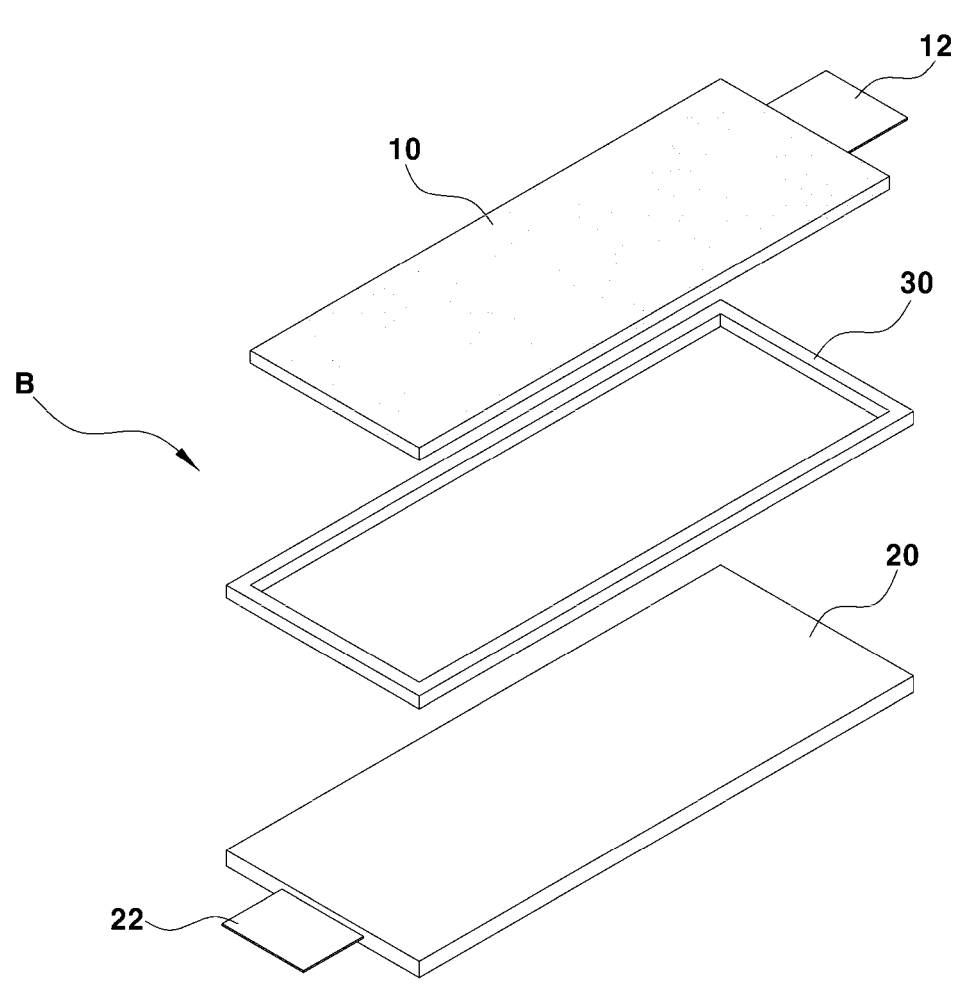
FIG. 2 is an exploded perspective view of FIG. 1.
Figure 3:
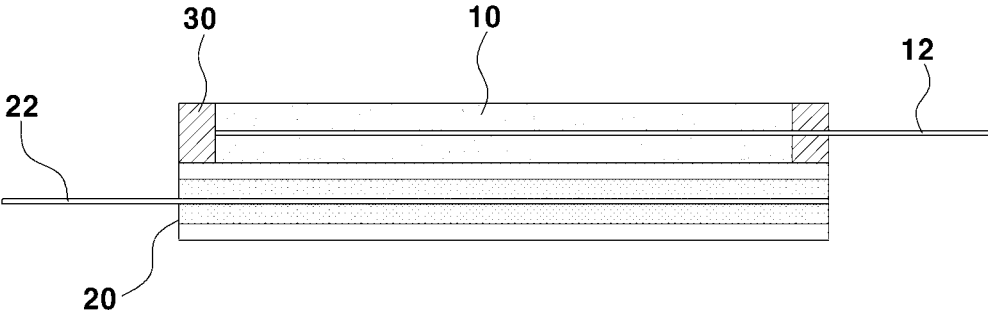
FIG. 3 is a longitudinal-sectional view taken along line A-A' of FIG. 1.

As shown in FIGS. 1 to 3, a bi-cell B of a battery includes a positive electrode 10, a negative electrode 20 and compensation members 30.

The positive electrode 10 and the negative electrode 20 are stacked on each other. A solid electrolyte is interposed between the positive electrode 10 and the negative electrode 20. Further, the solid electrolyte may be provided on the other surface of the negative electrode 20. The positive electrode 10 includes a positive electrode tab 12 for electrical connection to the outside, and the negative electrode 20 also includes a negative electrode tab 22 for electrical connection to the outside.

The compensation members 30 are disposed to come into contact with both the positive electrode 10 and the negative electrode 20. In particular, the compensation members 30 may be adhered to the negative electrode 20 to surround the edge of the positive electrode 10.

Figure 4:
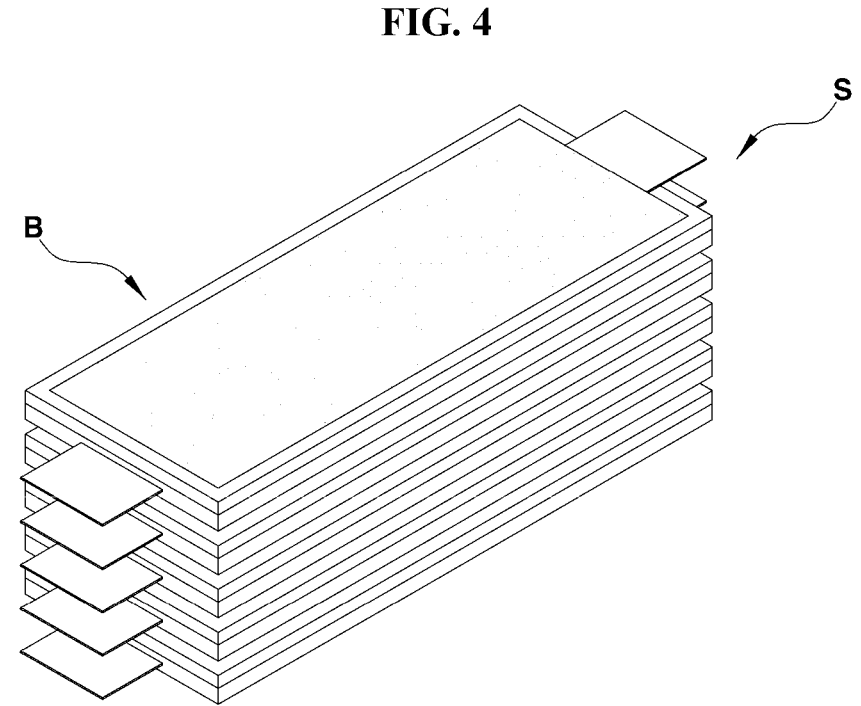
FIG. 4 is a perspective view of an example cell stack formed by stacking a plurality of bi-cells.

As shown in FIG. 4, a cell stack S can be formed by stacking a plurality of bi-cells B. For example, the cell stack C may be formed by stacking several to several tens of bi-cells B. The compensation members 30 compensate for a dimension difference between the positive electrode 10 and the negative electrode 20, thereby serving as a structure in the bi-cell B or the cell stack S.

The compensation members 30 may form an insulating layer and may prevent damage the bi-cell B or the cell stack S in the pressing process. For example, the compensation members 30 may prevent damage, such as insulation breakdown caused by the dimension difference between the positive electrode 10 and the negative electrode 20 in the pressing process when an all-solid-state battery is manufactured. As a non-limiting example, the compensation members 30 may be insulating tapes. In some examples of implementation, both surfaces of the compensation members 30 may have adhesiveness. In some examples of implementation, only one surface of the compensation members 30 may have adhesiveness.

Figure 5A:
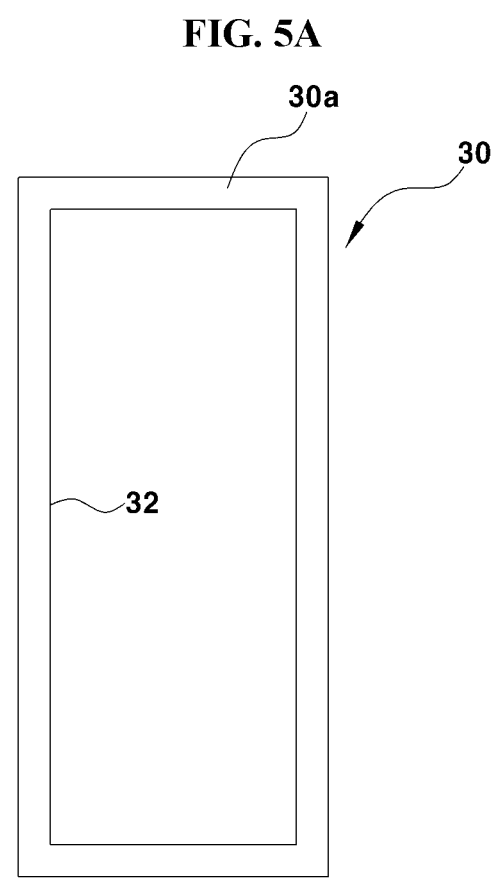
Figure 5B:
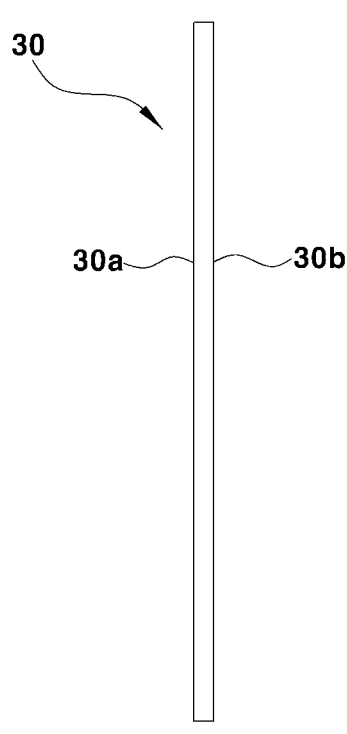
FIG. 5B is a side view showing the example compensation members.

Referring to FIGS. 5A and 5B, the compensation members 30 are provided in a frame shape. Although these figures illustrate the compensation members 30 as being provided in a rectangular frame shape, the shape formed by the compensation members 30 is not limited thereto, and may be changed depending on the shape of the positive electrode 10 and the negative electrode 20. However, the compensation members 30 may be provided in a ring shape or a frame shape regardless of the shape of the positive electrode 10 and the negative electrode 20.

According to one example of implementation, the positive electrode 10 is disposed inside the inner circumferences 32 of the compensation members 30. In this case, the negative electrode 20 is disposed to approximately coincide with the outer circumferences of the compensation members 30. The inner circumferences 32 of the compensation members 30 may be provided to be at least equal to or greater than the circumference of the positive electrode 10 so that the positive electrode 10 may be inserted into the compensation members and may be provided to be less than the circumference of the negative electrode 20. Further, the outer circumferences of the compensation members 30 may be provided to be at least equal to or greater than the circumference of the negative electrode 20.

The compensation members 30 includes two surfaces facing in opposite directions, i.e., an adhesive surface 30a and a free surface 30b. The adhesive surface 30a may be adhered to the negative electrode 20, and the free surface 30b may be adhered to a negative electrode 20 of another neighboring bi-cell B in the cell stack C. Further, the opposite is possible. That is, although the terms adhesive surface and free surface are used for the purpose of clarity of description, the adhesive surface 30a and the free surface 30b refer to one surface and the other surface of the compensation members 30. Hereinafter, for the purpose of consistency of description, the adhesive layer 30a will be described as being adhered to the negative electrode An adhesive may be applied in advance to the adhesive surface 30a to fix the compensation member 30 to the negative electrode 20. The adhesive applied to the adhesive surface 30a may be a material having adhesiveness at room temperature.

Further, an adhesive may be applied in advance to the free surface 30b to fix two neighboring bi-cells B to each other in the cell stack S. In particular, the adhesive applied to the free surface 30b may be an adhesive which is activated by heat. That is, such a thermosetting adhesive may be a material which does not have adhesiveness at room temperature but has adhesiveness at elevated temperatures by heating or the like.

Figure 6A:
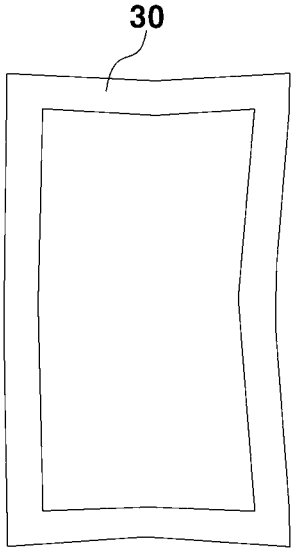
FIG. 6A is a front view showing one example of deformation of the compensation members.
Figure 6B:
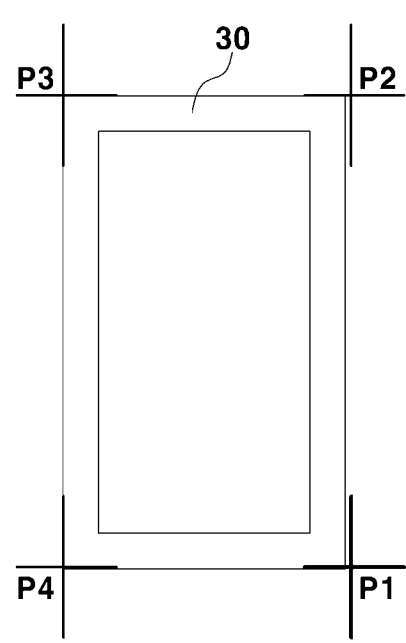
FIGS. 6B and 6C are views showing examples of misalignment of the compensation members.
Figure 6C:
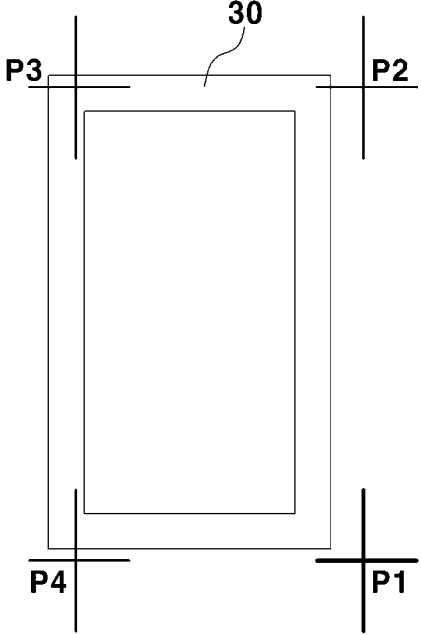

The compensation members 30 provided in such a ring shape are vulnerable to deformation. Further, when the compensation members 30 are adhered to an individual electrode, precision in adhesion is reduced, and there is a limit in securing productivity. For example, in case in which the entire surfaces of the compensation members 30 are not normally fixed or tension applied to the compensation members 30 is changed during a process of manufacturing the bi-cell B, the shapes of the compensation members 30 may be deformed, as shown in FIG. 6A. Referring to FIGS. 6B and 6C, for example, it is assumed that, among four corners P1, P2, P3 and P4 of the frame formed by the compensation members 30, the corner P1 is used as an alignment reference. In case in which the corner P1 is used as the alignment reference, when the corner P1 is mis-aligned, the whole area of the compensation members 30 is misaligned in terms of characteristics of the shape formed by the compensation members 30. That is, it may be confirmed that, when the corner P1, which is one of the four corners P1, P2, P3 and P4, is misaligned, all of other corners P2, P3 and P4 are misaligned.

Such a possibility of deformation may be removed through a process of adhering the compensation members 30. According to some implementations of the present disclosure, the compensation members 30 may be adhered to parallel edges of an electrode or the negative electrode 20 to simplify the process of adhering the compensation members 30 or to improve accuracy in alignment.

Figure 7:
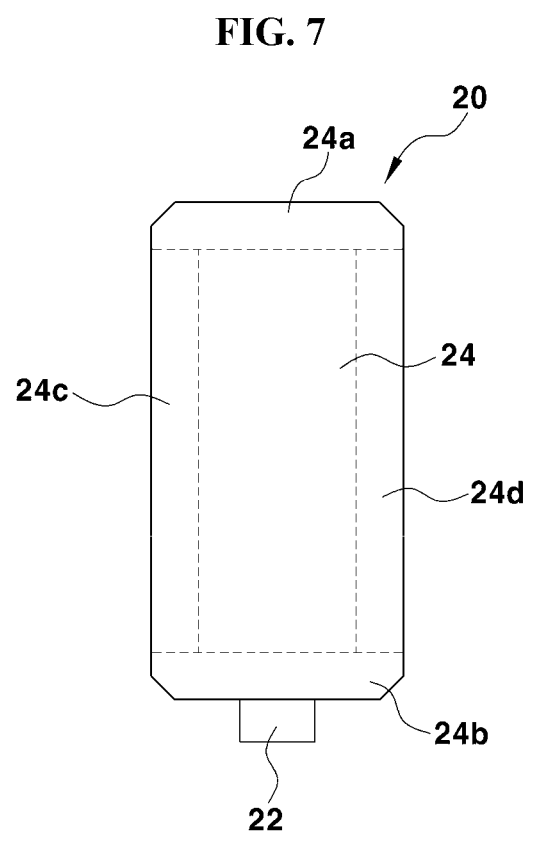

For example, as shown in FIG. 7, the negative electrode 20 includes a reference surface 24, which is one surface of the negative electrode 20, and the negative electrode 20 protrudes from the reference surface 24 by a designated thickness. That is, the negative electrode 20 has a designated thickness. The adhesive surfaces 30a of the compensation members 30 are adhered to the reference surface 24, and the reference surface 24 includes at least four side parts 24a, 24b, 24c, 24d.

Among the four side parts 24a, 24b, 24c, 24d, i.e., the first side part 24a, the second side part 24b, the third side part 24c and the fourth side part 24d, of the reference surface 24, the first side part 24a and the second side part 24b are substan-tially parallel or symmetrical to each other, and the third side part 24c and the fourth side part 24d are substantially parallel or symmetrical to each other.

Figure 8A:
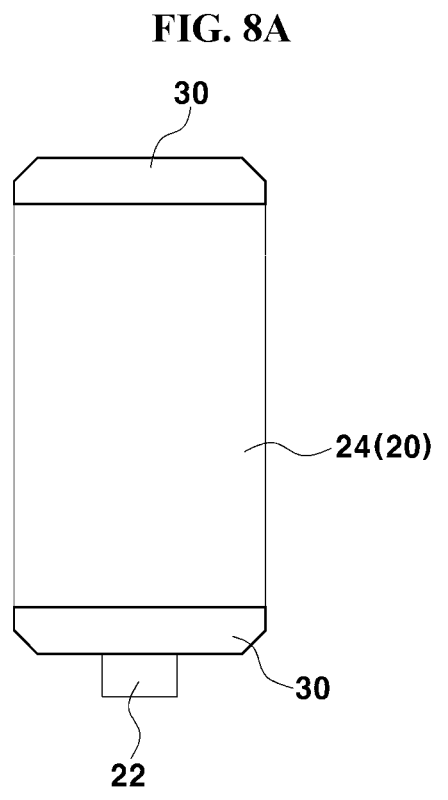
Figure 8B:
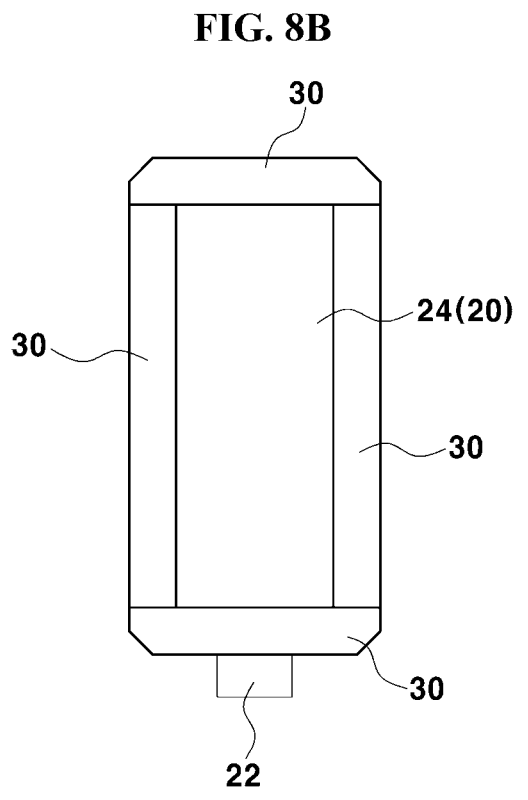
Figure 8C:
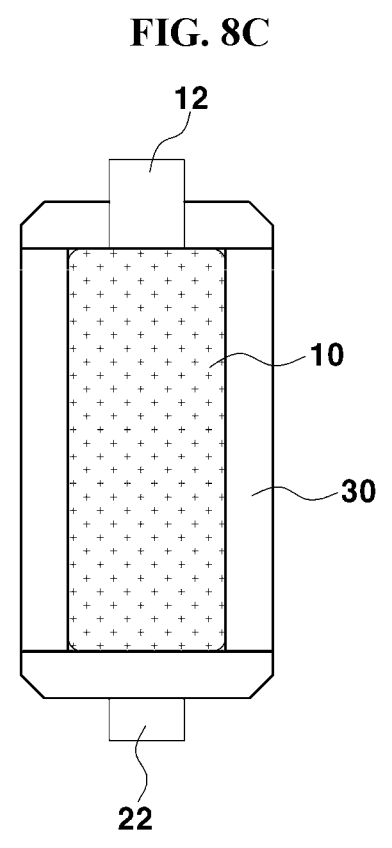

According to the present disclosure, when the compen-sation members 30 are adhered to the reference surface 24, as shown in FIGS. 8A and 8B, the compensation members 30 may be first adhered to the first side part 24a and the second side part 24b which are parallel to each other, and may then be adhered to the third side part 24c and the fourth side part 24d which are parallel to each other. On the contrary, the compensation members 30 may be first adhered to the third side part 24c and the fourth side part 24d, and may then be adhered to the first side part 24a and the second side part 24b. Here, the compensation members 30 may be adhered to the first side part 24a and the second side part 24b simultaneously or at different times. Further, the compen-sation members 30 may be adhered to the third side part 24c and the fourth side part 24d simultaneously or at different times. Thereafter, as shown in FIG. 8C, the positive elec-trode 10 is adhered to the negative electrode 20 inside the inner circumferences 32 of the compensation members 30, thereby completing manufacture of the bi-cell B.

Figure 9:
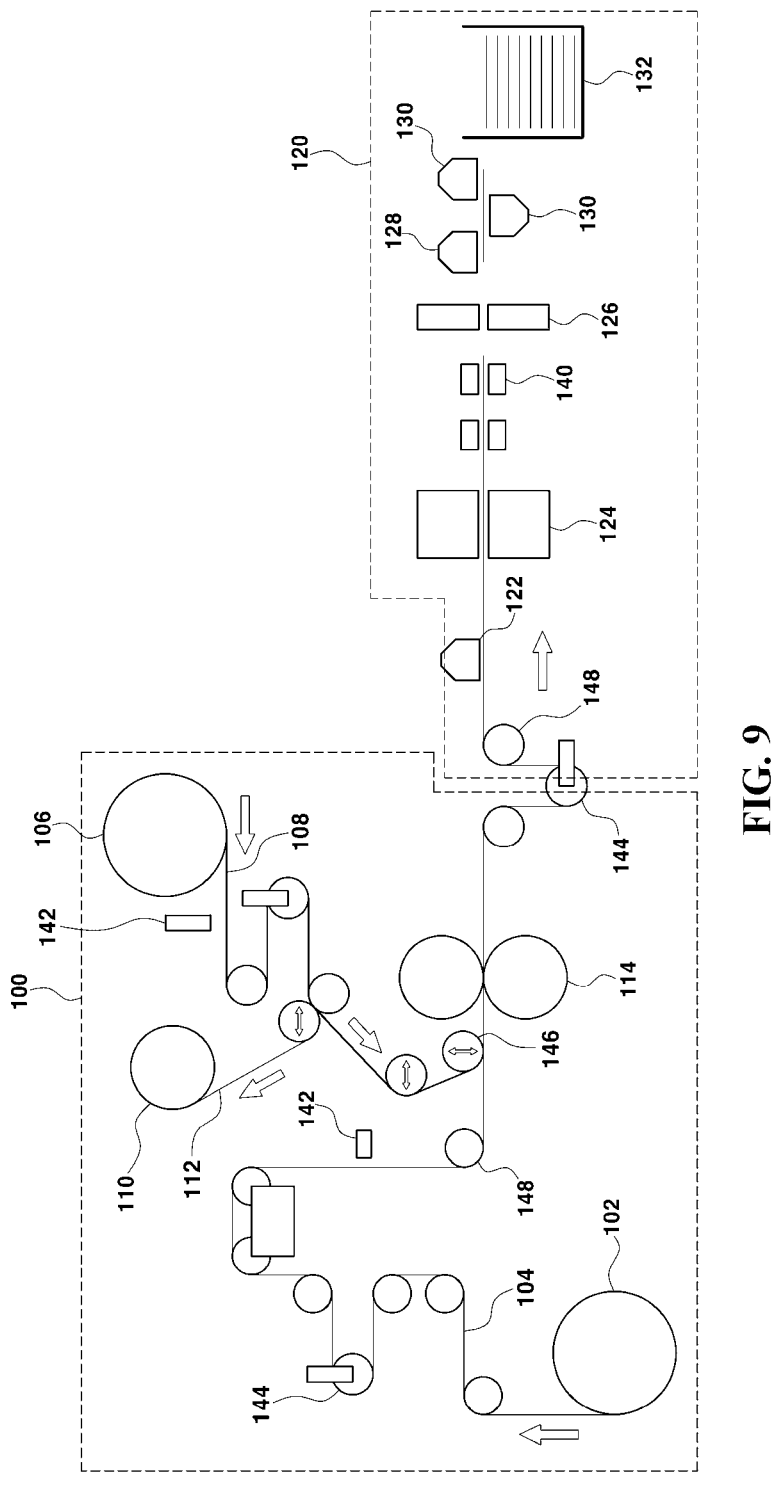
FIG. 9 a view showing an example system for manufacturing a bi-cell according to some implementations of the present disclosure.

According to some implementations of the present dis-closure, adhesion of the compensation members 30 to two parallel side parts of the reference surface 24, particularly, the first side part 24a and the second side part 24b may be achieved through an exemplary roll-to-roll process, as shown in FIG. 9. Thereby, the compensation members 30 may be rapidly and continuously adhered to a larger number of electrodes.

Figure 10A:
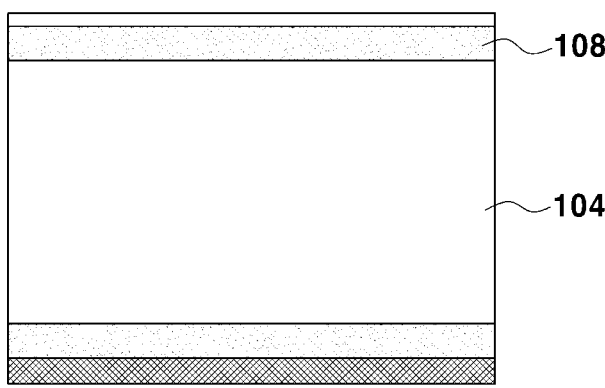
FIGS. 10A and 10B are views showing the process of adhering the compensation members according to the present disclosure.
Figure 10B:
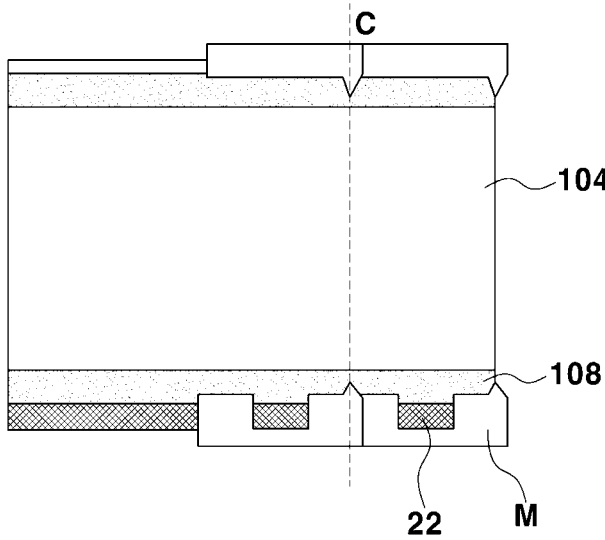
Figure 11A:
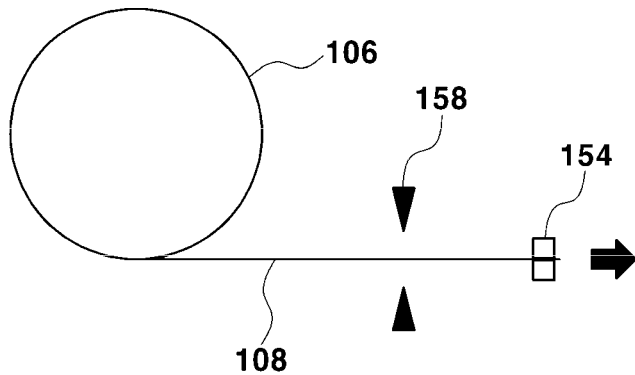
FIGS. 11A to 11D are views showing the system according to some implementations of the present disclosure.
Figure 11B:
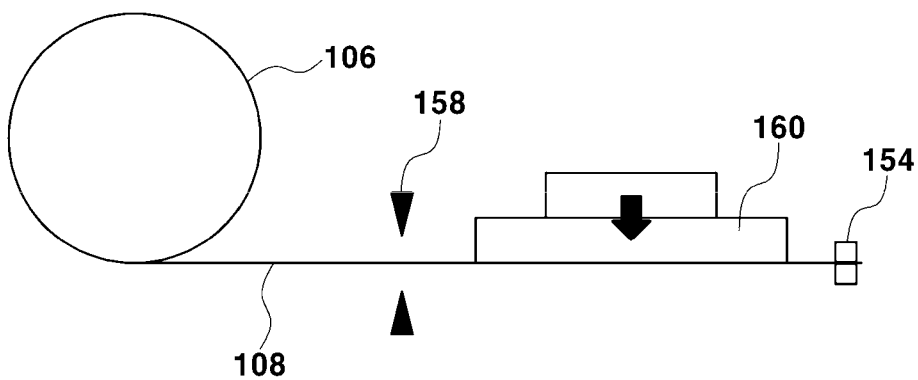
Figure 11C:
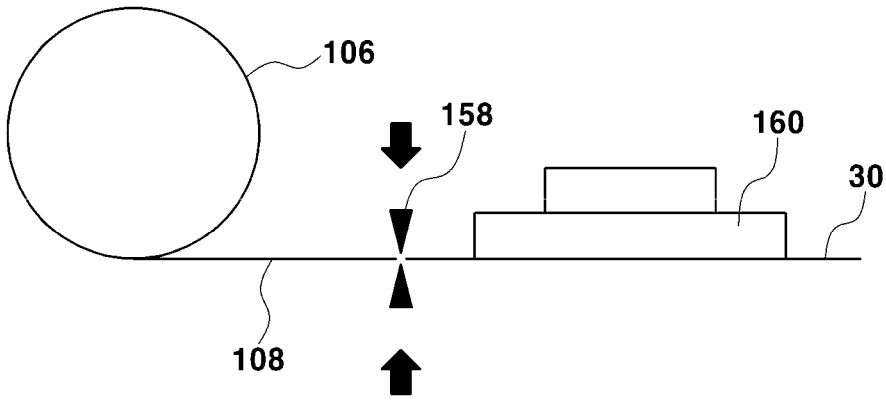
Figure 11D:
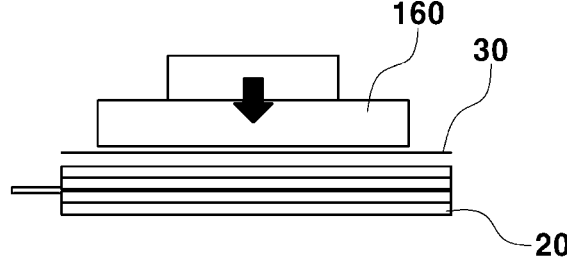

A continuous body 108 of compensation member is adhered to the first side part 24a and the second side part 24b of a negative electrode sheet 104 unwound from a negative electrode sheet roll 102 (with reference to FIG. 10A). An individual negative electrode 20 is manufactured by forming a negative electrode tab 22 on the negative electrode sheet 104 through a terminal processing machine M and cutting the negative electrode sheet 104 into a designated size along a cut line C (with reference to FIG. 10B). Formation of the negative electrode tab 22 and cutting of the negative elec-trode sheet 104 into the individual negative electrode 20 may be performed simultaneously or may be performed at different times. The negative electrode sheet 104 is generally cut into the individual negative electrode 20 after formation of the negative electrode tab 22, but the opposite is possible or formation of the negative electrode tab 22 and cutting of the negative electrode sheet 104 into the individual negative electrode 20 may be executed at the same time.

For example, referring to FIG. 9, the negative electrode sheet 104 is continuously unwound from the negative elec-trode sheet roll 102 on which the negative electrode sheet 104 is wound, to form a plurality of negative electrodes 20. Further, the continuous body 108 of compensation member is continuously unwound from a compensation member roll 106 on which the continuous body 108 of compensation member is wound.

For the case in which a protective film 112 is adhered to the continuous body 108 of compensation member, the protective film 112 can be removed from the continuous body 108 of compensation member by a protective film winder 110. The protective film 112 may be provided optionally or may be provided to protect the adhesive surface 30a of the continuous body 108 of compensation member.

Thereafter, the negative electrode sheet 104 and the continuous body 108 of compensation member are put into a combination unit 114 so that the continuous body 108 of compensation member is adhered to the negative electrode sheet 104 or the first side part 24a and/or the second side part 24b of the negative electrode sheet 104. That is, the con-tinuous body 108 of compensation member meets with the negative electrode sheet 104 and is adhered to the negative electrode sheet 104 by the combination unit 114. In one example of implementation according to the present disclo-sure, the rolls 102 and 106, the winder 110 and the combi-nation unit 114 may be operated by driving forces, and for example, driving forces supplied by servomotors.

Thereafter, vision inspection, electrode formation, etc., may be executed. First, the negative electrode sheet 104 and the continuous body 108 of compensation member com-bined with each other are inspected through a compensation member vision unit 122. For example, it may be determined whether or not the position of the continuous body 108 of compensation member adhered to the negative electrode sheet 104 is appropriate. Further, negative electrode tabs 22 are manufactured on the negative electrode sheet 104 by a press 124. The negative electrode sheet 104 and the con-tinuous body 108 of compensation member combined with each other are cut into predetermined sizes along the cut line C, thereby manufacturing a plurality of negative electrodes 20. Thereafter, the sizes and the surfaces of the processed negative electrodes 20 are inspected through a size vision unit 128 and a surface vision unit 130, and the negative electrodes 20 having passed through these inspections are loaded in a loading box 132. The vision units can include a camera and/or other types of vision-based inspection sensors and mechanisms.

This process may include a continuous region 100 and an intermittent region 120. During the process, in the continuous region 100, the continuous body 108 of compensation member and the negative electrode sheet 104 may be controlled at a designated tension and a designated feed rate. In the intermittent region 120, precise control may be applied to a transfer distance. The reason for this is i) to match the position of the compensation member on the negative electrode sheet 104, the manufacture positions of the negative electrode tabs 22 on the negative electrode sheet 104, and the cut positions of the negative electrode sheet 104 into the respective negative electrodes 20 with each other, and ii) to inspect the position of the compensation member 30 on the negative electrode sheet 104 and the sizes and surface states of the negative electrodes 20, in the intermittent region 120.

In the intermittent region 120, a roll feeder, a grip feeder 140, etc., may be further provided, thereby being capable of defining a stop section in which the negative electrodes 20 having the compensation members 30 adhered thereto may be more precisely fed and the press 124, the cutter 126 and the vision units 122, 128 and 130 may perform their own functions.

Further, an edge position control (EPC) system 142 may be provided in this process. Correction of meandering of the negative electrode sheet 104 unwound from the negative electrode sheet roll 102 and the continuous body 108 of compensation member unwound from the compensation member roll 106 through the EPC system 142 is completed before the negative electrode sheet 104 and the continuous body 108 of compensation member reach the combination unit 114. Further, the continuous body 108 of compensation member may be aligned with the negative electrode sheet 104 through the EPC system 142. As a non-limiting example, when meandering control is performed through the EPC system 142, the EPC system may be configured in a pivot type or a spool type.

Dancers 144 configured to control tension may be further provided in this process. In particular, tension control may be performed through the dancers 144 before and after a cutting section. As a non-limiting example, a powder brake, a powder clutch, etc., may be further provided. In tension control through the dancers 144, tension fluctuation may be minimized using a low-friction cylinder, and the feed rate may be compensated for by sensing the positions of the dancers 144. In tension control through the powder brake and the powder clutch, a load cell may be further provided, and thus, compensation control may be performed by sensing tension of a target object which is being fed.

The system may further include adjustment rolls 146. The adjustment rolls 146 may correct web angles at an upstream region from the combination unit 114, at a point where the protective film 112 is removed from the continuous body 108 of compensation member, etc. Further, a plurality of rollers 148 may be provided to appropriately guide the transfer paths of the negative electrode sheet 104 and the continuous body 108 of compensation member. Although reference numerals are not represented in FIG. 9, elements marked with a rectangle overlapping a circle indicate the dancers 144, and elements marked with an arrow disposed in a circle indicate the adjustment rolls 146.

Thereafter, according to some implementations of the present disclosure, as shown in FIGS. 11A to 11D, adhesion of the compensation members 30 to two other parallel side parts of the negative electrode 20 or the third side pat 24c and the fourth side part 24d of the negative electrode 20 may be performed. In particular, the continuous body 108 of compensation member fed from the compensation member roll 106 may be cut and processed into the compensation members 30, and the processed compensation members 30 may be fed to a multi-axis feeding apparatus and may be adhered to the third side pat 24c and the fourth side part 24d of the negative electrode 20.

For example, the continuous body 108 of compensation member is fed from the compensation member roll 106. Here, a roll feeding method or a grip feeding method may be applied to the continuous body 108 of compensation member. The free end of the continuous body 108 of compensation member is gripped by a gripper unit 154 (with reference to FIG. 11A). Further, the gripper unit 154 may be mounted on a gripper transporter 156 to adjust the lengths of the compensation members 30 cut from the continuous body 108 of compensation member and to adjust tension of the compensation members 30. Further, an adsorption unit 160 is provided. The adsorption unit 160 may adsorb the continuous body 108 of compensation member to move the continuous body 108 of compensation member to the negative electrode 20 by adsoprtion. As a non-limiting example, the adsorption unit 160 may lift the continuous body 108 of compensation member using vacuum adsorption or the like (with reference to FIG. 11B). When adsorption of the continuous body 108 of compensation member through the adsorption unit 160 has been completed, the continuous body 108 of compensation member 8 may be cut into the compensation member 30 having a predetermined length by a knife unit 158 (with reference to FIG. 11C). Thereafter, the adsorption unit 160 is moved to the negative electrode 20 to which the cut compensation member 30 will be adhered. The adsorption unit 160 adheres the compensation member 30 to a predetermined position of the negative electrode 20 (with reference to FIG. 11D). Here, although this implementation describes preparation of one compensation member 30, a pair of compensation members 30 may be prepared. That is, the compensation roll 106, the gripper unit 154, the knife unit 158 and the adsorption unit 160 may be configured to simultaneously grip a pair of compensation members 30, which will be adhered to the third side part 24c and the fourth side part 24d, and to simultaneously adhere the pair of compensation members 30 to the third side part 24c and the fourth side part 24d of the negative electrode 20. Further, although this implementation assigns reference numeral 106 to the compensation member roll used to adhere the compensation members 30 to the third and fourth side parts 24c and 24d in the same manner as the compensation member roll 106 used to adhere the compensation members 30 to the first and second side parts 24a and 24b, the compensation member roll 106 used to adhere the compensation members 30 to the third and fourth side parts 24c and 24d does not necessarily need to be identical to the compensation member roll 106 used to adhere the compensation members 30 to the first and second side parts 24a and 24b, and may be provided separately from the compensation member roll 106 used to adhere the compensation members 30 to the first and second side parts 24a and 24b.

Figure 12:
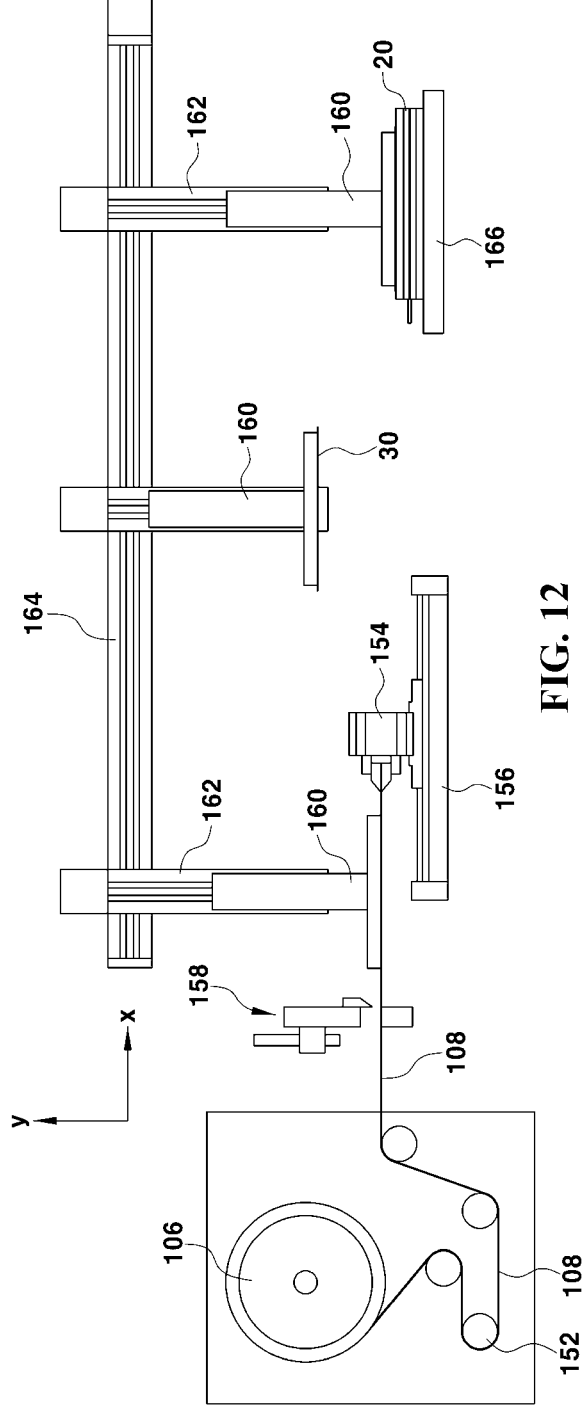
FIGS. 12 and 13 are front and plan views of the system according to some implementations of the present disclosure.
Figure 13:
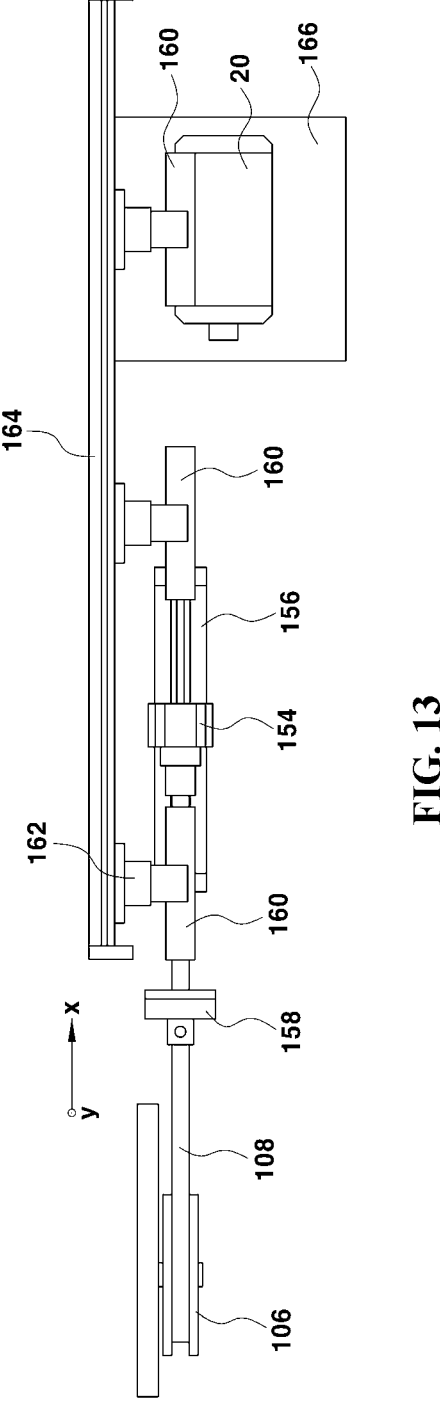

Referring to FIGS. 12 and 13, a detailed operating mechanism according to one implementation of the present disclosure will be described. Tension of the continuous body 108 of compensation member unwound from the compensation member roll 106 may be adjusted by at least one tensioner 152. The continuous body 108 of compensation member is disposed to pass through the knife unit 158, and the free end of the continuous body 108 of compensation member is gripped by the gripper unit 154. The gripper unit 154 is mounted on the gripper transporter 156 which is movable in the unwinding direction of the continuous body 108 of compensation member or along the X-axis to be movable in both directions along the X-axis.

Further, the adsorption unit 160 is mounted on an X-axis mover 164 which is movable along the X-axis and is combined with a Y-axis mover 162 which is movable along the Y-axis. In this implementation, the transporter 156 and the movers 162 and 164 may be linear actuators.

The adsorption unit 160 approaches the continuous body 108 of compensation member gripped by the gripper unit 154 through the Y-axis mover 162, and adsorbs the continuous body 108 of compensation member. Thereafter, the continuous body 108 of compensation member is cut into the compensation member 30 having the predetermined length by the knife unit 158. The adsorption unit 160 is raised through the Y-axis mover 162 and is moved to an electrode stage 166 on which electrodes are provided to adhere the compensation member 30 thereto, through the X-axis mover 164. A plurality of negative electrodes 20 may be stacked on the electrode stage 166 and may be fixed using an adsorption or grip method to prevent position change caused by adhesion of the compensation member 30 thereto.

The adsorption unit 160 is lowered through the Y-axis mover 162 and adheres the compensation member 30 to the reference surface 24 of the negative electrode 20. After the adhesion, whether or not the negative electrode 20 is defective may be determined by inspecting the position of the compensation member 30 adhered to the negative electrode 20, the positions of the compensation member 30 adhered to the first side part 24a and the second side part 24b, etc., through vision detection.

As described above, according to the present disclosure, the compensation members 30 are independently adhered to the first to fourth side parts 24a, 24b, 24c, 24d of the reference surface 24 of the negative electrode 20 in regular order, thereby being capable of minimizing deformation arising in processing. Further, alignment qualities at the respective side parts 24a, 24b, 24c, 24d may be independently secured.

Although this implementation describes adhesion of the compensation members 30 to the negative electrode 20, the present disclosure is not limited thereto, and the compensation members 30 may be adhered to the positive electrode 10.

In implementations of the present disclosure, a control system may be further provided to manage and control operation of the respective elements, such as the respective rolls 102, 106, the combination unit 114, the vision units 122, 128, 130, the press 124, and the cutter 126, at the right times.

According to the present disclosure, a battery may include compensation members configured to compensate for a dimension difference between a negative electrode and a positive electrode, thereby being capable of preventing damage to electrodes occurring in a pressing process.

Further, according to the present disclosure, deformation of the compensation members may be minimized during a process of adhering the compensation members, thereby being capable of stabilizing the adhesion process and improving the overall quality of the battery.

In addition, in case in which a cell stack is formed by stacking bi-cells manufactured according to the present disclosure, a positive electrode is inserted into the compensation members, and thus, position change between the negative electrode and the positive electrode may be prevented. Further, fixing force between the bi-cells may be improved using the adhesive force of the compensation members in the cell stack.

As is apparent from the above description, the present disclosure provides a method of manufacturing a battery which may compensate for a dimension difference between a negative electrode and a positive electrode to prevent damage to electrodes during a pressing process.

Further, the present disclosure provides a method of manufacturing a battery which may stabilize a process of adhering compensation members for compensating for a dimension difference between a negative electrode and a positive electrode, and may improve the quality of the battery as a whole.

The disclosure has been described in detail with reference to various implementations thereof. However, it will be appreciated by those skilled in the art that changes may be made in these implementations without departing from the principles and spirit of the disclosure, the scope of which is defined in the appended claims and their equivalents.

What is claimed is:

1. A method of manufacturing a bi-cell of a battery, wherein the bi-cell includes a first electrode that has a reference surface and is formed to have a designated thickness, wherein a circumference of the reference surface is defined by at least four side parts, the at least four side parts having a first side part and a second side part that are symmetrical to each other with respect to a center of the reference surface, and a third side part and a fourth side part that are symmetrical to each other with respect to the center of the reference surface, the method comprising:

adhering first compensation members to the first side part and the second side part simultaneously or at different times; and adhering second compensation members to the third side part and the fourth side part simultaneously or at different times.

2. The method of claim 1, wherein the first electrode is formed from an electrode sheet, and the first compensation members are formed from a first continuous body of compensation member; and wherein adhering of the first compensation members comprises:

unwinding the electrode sheet from an electrode sheet roll, and unwinding the first continuous body of compensation member from a first compensation member roll, and adhering the unwound first continuous body of compensation member to each of the first side part and the second side part.

3. The method of claim 2, wherein adhering of the first compensation members further comprises:

cutting into predetermined lengths the electrode sheet having the first continuous body of compensation member that is adhered to the first side part and the second side part, to thereby form a plurality of first electrodes wherein the first compensation members are adhered to each of the first electrodes.

4. The method of claim 3, wherein adhering of the second compensation members comprises:

unwinding a second continuous body of compensation member from a second compensation member roll, forming the second compensation members by cutting the second continuous body of compensation member into predetermined lengths; and transporting the second compensation members and thereafter adhering the second compensation members to the third side part and the fourth side part of each of the first electrodes.

5. The method of claim 4, further comprising:

stacking a second electrode on a region of the reference surface defined by the first compensation members and the second compensation members, wherein the first electrode and the second electrode have different polarities.

6. The method of claim 5, wherein the first electrode is a negative electrode, and the second electrode is a positive electrode.

7. The method of claim 1, wherein adhering of the first compensation members to the first side part and the second side part is performed prior to adhering of the second compensation members to the third side part and the fourth side part.

\* \* \* \* \*